United States Patent
Itoh

(10) Patent No.: US 8,411,937 B2
(45) Date of Patent: Apr. 2, 2013

(54) IMAGE PROCESSING APPARATUS, IMAGE PROCESSING METHOD AND COMPUTER-READABLE MEDIUM

(75) Inventor: Atsushi Itoh, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 1343 days.

(21) Appl. No.: 12/128,921

(22) Filed: May 29, 2008

(65) Prior Publication Data

US 2009/0041343 A1 Feb. 12, 2009

(30) Foreign Application Priority Data

May 31, 2007 (JP) .................. 2007-145164

(51) Int. Cl.
*G06K 9/00* (2006.01)

(52) U.S. Cl. ..................................... 382/162

(58) Field of Classification Search .......... 382/162–167, 382/168–170, 232–251; 358/1.2, 1.9, 518, 358/537–539, 521–523; 345/589–604
See application file for complete search history.

(56) References Cited

U.S. PATENT DOCUMENTS

| | | | | |
|---|---|---|---|---|
| 6,771,813 B1 * | 8/2004 | Katsuyama | ............... | 382/165 |
| 7,046,390 B2 * | 5/2006 | Atkins | ............... | 358/1.2 |
| 7,085,006 B2 * | 8/2006 | Yokoyama et al. | ............ | 358/1.9 |
| 7,729,534 B2 * | 6/2010 | Maeda | ............. | 382/165 |
| 7,751,620 B1 * | 7/2010 | Cosoi | .............. | 382/168 |
| 8,035,853 B2 * | 10/2011 | Sambongi et al. | ........... | 358/1.9 |
| 2005/0207647 A1 | 9/2005 | Maeda | | |

FOREIGN PATENT DOCUMENTS

| | | |
|---|---|---|
| CN | 1674035 A | 9/2005 |
| JP | A 05-061974 | 3/1993 |
| JP | A 08-56287 | 2/1996 |
| JP | A-08-087258 | 4/1996 |
| JP | A 2003-085556 | 3/2003 |
| JP | A-2005-236660 | 9/2005 |
| JP | A-2005-260452 | 9/2005 |
| JP | A-2005-269271 | 9/2005 |
| JP | A-2005-303953 | 10/2005 |
| JP | A-2006-229280 | 8/2006 |

OTHER PUBLICATIONS

Office Action issued in corresponding Chinese Patent Application No. 200810108667.8, issued Oct. 9, 2010.
Office Action issued in Japanese Patent Application No. 2007-145164 dated Dec. 21, 2011 (with translation).

* cited by examiner

*Primary Examiner* — Ishrat I Sherali
(74) *Attorney, Agent, or Firm* — Oliff & Berridge, PLC

(57) ABSTRACT

An image processing apparatus includes an analyzing unit, a determining unit and a color conversion unit. The analyzing unit analyzes colors being used in an image. The determining unit determines, based on an analysis result provided by the analyzing unit, as to whether or not the colors being used in the image are converted into one or more limited colors. When the determining unit determines that the colors being used in the image are converted into the one or more limited colors, the color conversion unit converts the colors being used in the image into the one or more limited colors.

14 Claims, 13 Drawing Sheets

PEAK COLOR

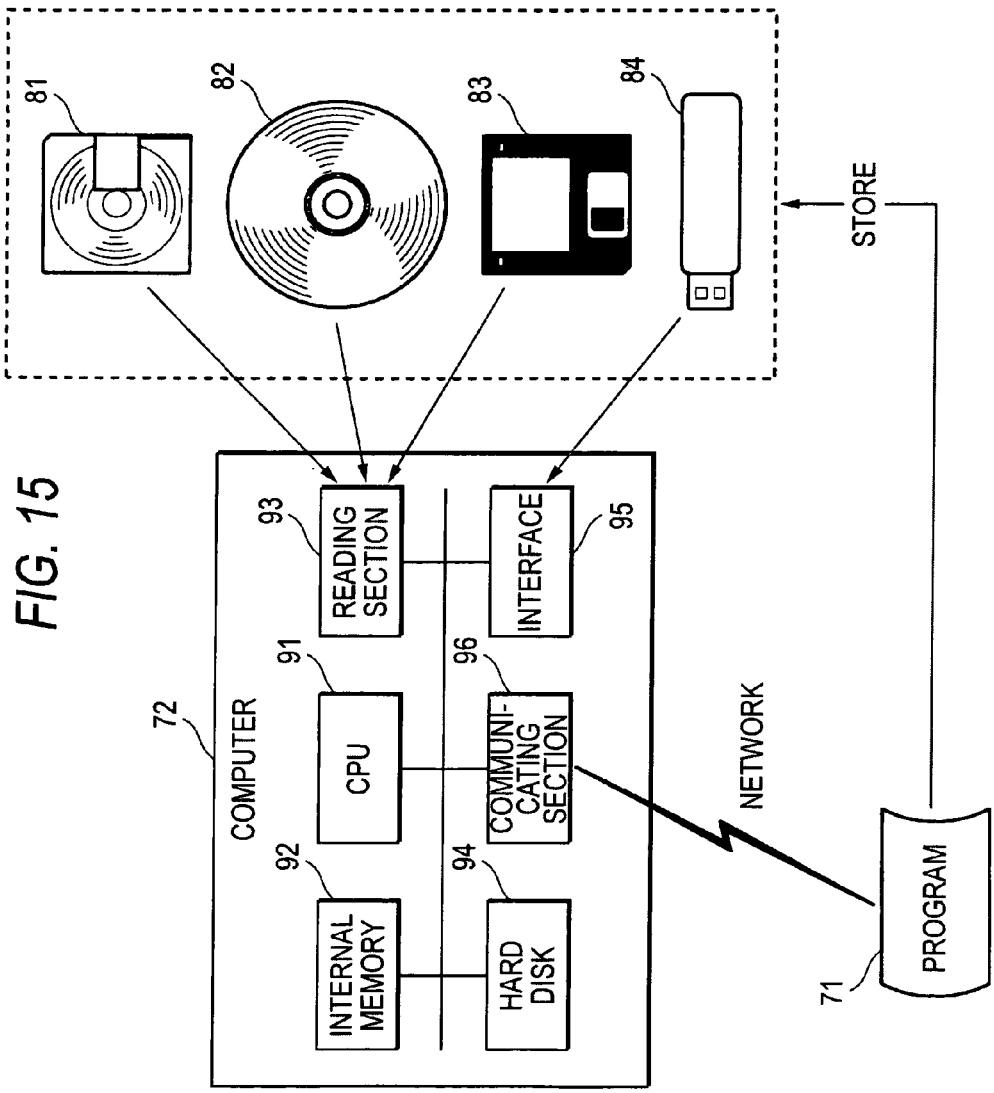

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 USC 119 from Japanese Patent Application No. 2007-145164 filed May 31, 2007.

BACKGROUND

1. Technical Field

The invention relates to an image processing apparatus, an image processing method and a computer-readable medium.

2. Related Art

A color limiting process that reduces the number of colors being used in an image has been conducted. By the color limiting process, various noises or unevenness contained in an image can be reduced. For example, if the image is obtained by reading an original image using an image reading device, printing unevenness on the original or a scanning noise during the reading operation is reduced. Also, if the original has hand-written portions thereon, unevenness caused by the hand-writing is reduced. Furthermore, when an image is compressed, a compression noise can be reduced and the compression ratio can be increased.

SUMMARY

According to an aspect of the invention, an image processing apparatus includes an analyzing unit, a determining unit and a color conversion unit. The analyzing unit analyzes colors being used in an image. The determining unit determines, based on an analysis result provided by the analyzing unit, as to whether or not the colors being used in the image are converted into one or more limited colors. When the determining unit determines that the colors being used in the image are converted into the one or more limited colors, the color conversion unit converts the colors being used in the image into the one or more limited colors.

BRIEF DESCRIPTION OF THE DRAWINGS

Exemplary embodiments of the invention will be described in detail below based on the attached drawings, wherein:

FIG. 15 is an explanatory view showing an example of a computer program, a storage medium storing the computer program and a computer when functions of the exemplary embodiments of the invention are implemented by the computer program.

DETAILED DESCRIPTION

Figure 1:
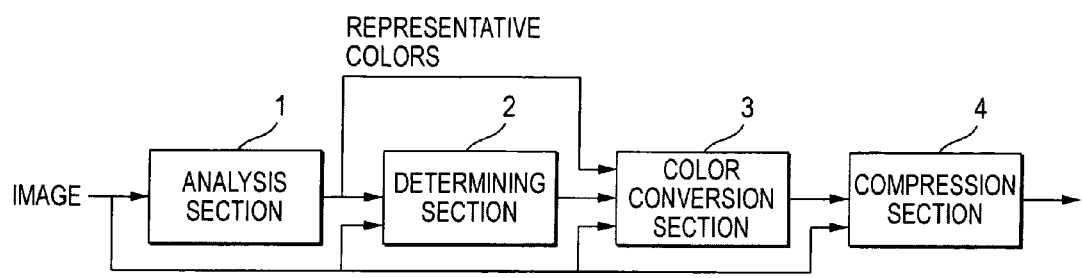
FIG. 1 is a block diagram showing a first exemplary embodiment of the invention.

FIG. 1 is a block diagram showing a first exemplary embodiment of the invention. In the drawing, reference numeral 1 denotes an analysis section, reference numeral 2 denotes a determining section, reference numeral 3 denotes a color conversion section, and reference numeral 4 denotes a compression section. The analysis section 1 analyzes colors being used in an input image and sends the analysis result to the determining section 2. In the first exemplary embodiment, the analysis section 1 extracts one or plural representative colors which will be used as limited colors in the color conversion section 3, and sends the extracted representative colors to the determining section 2 as the analysis result.

The determining section 2 determines, based on the analysis result by the analysis section 1, as to whether or not the colors being used in the input image are to be converted to the limited colors. In the first exemplary embodiment, the one or plural representative colors are sent from the analysis section 1. Therefore, the determining section 2 determines, based on the representative colors, as to whether or not a color limiting process of converting the colors of the image to the representative colors is to be executed. An example of this determination method will be described later.

When the determining section 2 determines that the colors are to be converted to the limited colors, the color conversion section 3 converts the colors being used in the input image to the limited colors. In the first exemplary embodiment, the representative colors are extracted by the analysis section 1. Therefore, the colors being used in the input image are converted to the representative colors.

Also, in the example of FIG. 1, the compression section 4 is provided, and the image is compressed by the compression section 4. When the colors are converted to the limited colors by the color conversion section 3, the compression section 4 performs the compression process for the image, which are output from the color conversion section 3 and have been subjected to the color limiting process. In this case, since the number of colors used is small, a high compression ratio can be obtained even if a lossless compression process is performed thereon. On the other hand, if the colors are not converted to the limited colors by the color conversion section 3, the compression process is performed for the input image.

In this case, if the number of colors used is large, a high compression ratio is not expected by performing the lossless compression process. The image processing apparatus of the first exemplary embodiment may be configured so as not to include the compression section 4.

Hereinafter, the analysis section 1, the determining section 2, and the color conversion section 3, which are a main part of the first exemplary embodiment, will be described in detail. In the first exemplary embodiment, the analysis section 1 acquires the one or plural representative colors. A method for acquiring the representative colors is arbitrary. A method in which a user designates the representative colors or a method in which preset representative colors are acquired from the outside may be used. In this exemplary embodiment, the representative colors are automatically extracted from the input image. As the automatic extraction method, a method described in JP Hei. 5-61974 A, for example, may be used. An example that uses another method for extracting the representative colors will be described below.

Figure 2:
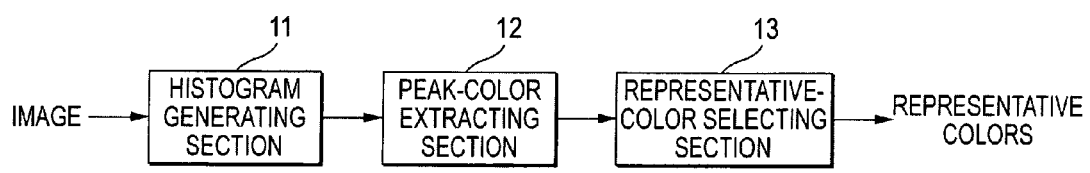
FIG. 2 is a block diagram showing an example of an analysis section 1 according to the first exemplary embodiment of the invention.

FIG. 2 is a block diagram showing an example of the analysis section 1 according to the first exemplary embodiment of the invention. FIG. 3 is an explanatory view showing an example of the operation of the analysis section 1. In the drawings, reference numeral 11 denotes a histogram generating section, reference numeral 12 denotes a peak-color extracting section, and reference numeral 13 denotes a representative-color selecting section.

Figure 3A:
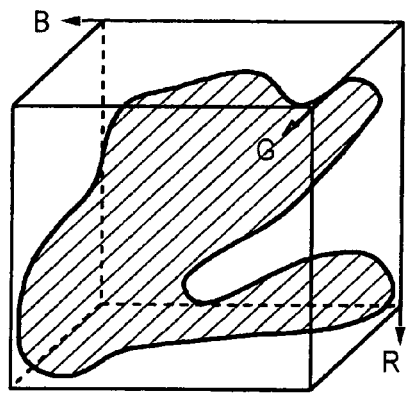
FIG. 3A to 3C are explanatory views showing an example of the operations of the analysis section 1 according to the first exemplary embodiment of the invention.
Figure 3B:
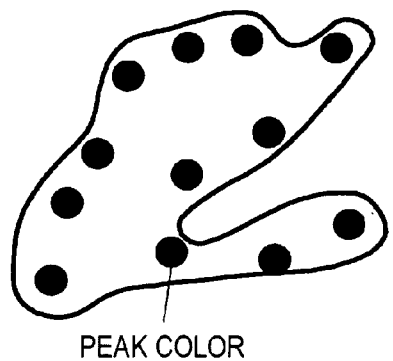

The histogram generating section 11 counts color values of respective pixels of the input image and generates a three-dimensional histogram in a color space. FIG. 3A shows an example of a histogram distribution in the RGB color space. By calculating quantized color values of the respective pixels, in many cases, the counting values (excluding 0) are distributed only in a partial area of the color space as indicated by the hatched area, for example. In the following description, only a partial area will be shown where the counting values other than 0 are distributed. If the histogram in the color space is generated by counting pixel numbers for each color value, a data amount becomes very huge. Therefore, for example, the color values are quantized, and the pixel numbers are collectively counted for color values within certain ranges.

The peak-color extracting section 12 extracts, from the histogram generated by the histogram generating section 11, peak colors having local maximum frequencies. For example, by performing second-derivative filtering for the three-dimensional histogram, the local maximums (peak colors) in the three-dimensional histogram are extracted. Needless to say, the peak colors may be extracted by a process other than the second-derivative filtering, such as first-derivative filtering. Moreover, plural peak-color extracting processes may be used in combination. The peak colors extracted by the peak-color extracting section 12 are shown by dark circles in FIG. 3B. Colors which are mainly used in the input image, and particularly colors which are chromatically different from other colors are extracted as the peak colors.

The representative-color selecting section 13 selects the representative colors from the peak colors extracted by the peak-color extracting section 12. The peak colors extracted by the peak-color extracting section 12 may be used, per se, as the representative colors. In this exemplary embodiment, one or plural representative colors are selected from the peak colors. For example, a predetermined number of peak colors may be selected as the representative colors in a descending order of the counting value. Alternatively, plural similar peak colors may be grouped and selected as a single representative color. For example, peak colors which are surrounded by a narrow line in FIG. 3C may be grouped and peak colors which are denoted by a double circle "⊚" may be selected as representative colors. In this case, the method of integrating the peak colors into groups and selecting the peak colors to remain after the integration is arbitrary. As an example of the peak-color integration method, the following method may be used. That is, the method draws a line segment connecting a paper color to black, calculates vectors representing minimum distances between the line segment and the respective peak colors, and integrates the peak colors into groups using at least the directions of the vectors and brightness differences as feature amounts. Moreover, which color is to be remained after the integration may be determined using at least one of the chromaticities, frequencies, and derivatives of the frequencies of the respective peak colors.

Figure 3C:
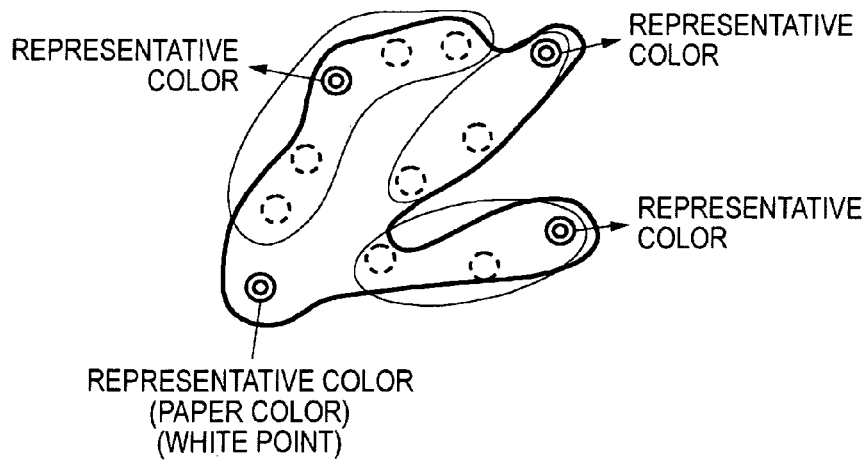
Figure 4:
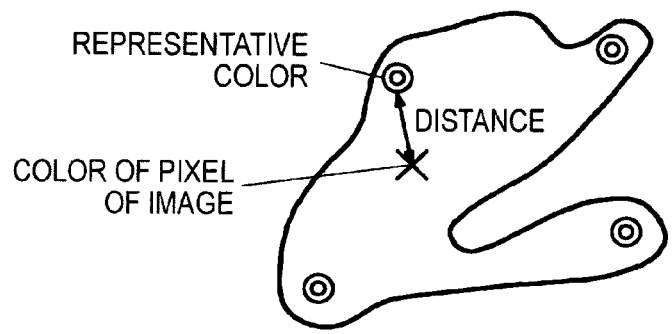
FIG. 4 is an explanatory view showing a first operation example of a determining section according to the first exemplary embodiment of the invention.

The determining section 2 determines, using the representative colors extracted by the analysis section 1, as to whether or not the color limiting process of converting the colors of the input image to the representative colors is to be performed. FIG. 4 is an explanatory view of a first operation example of the determining section 2 according to the first exemplary embodiment of the invention. As one method of determining as to whether or not the color limiting process is to be performed, the following method may be used. That is, the method calculates a color difference between a color of each pixel of the input image and a corresponding representative color to which the color of each pixel is to be converted, calculates a sum of the color differences for the respective pixels, and determines as to whether or not the sum is within a predetermined range. For example, in the example of FIG. 4, it is assumed that the representative colors shown in FIG. 3C are extracted by the analysis section 1 and that a color of a given pixel in the input image is denoted by "X". In this case, a distance between the color denoted by "X" and the representative color to which the color denoted by "X" is to be converted is calculated in a color space (the distance is represented by a bidirectional arrow in the drawing).

The distances are calculated for the colors of the respective pixels of the image and are summed. For example, the sum is calculated based on the following expression:

$$\sum_i \sum_j |Cr_i - C_{ij}|$$

where
$Cr_i$ denotes the representative colors,
$C_{ij}$ denotes colors of pixels in the image corresponding to the representative color $Cr_i$, and
i and j denote integers.

It is noted that i may be equal to 1. For example, all colors in an image are a paper color or colors similar to the paper color, a single representative color (paper color) is extracted. In this case, i becomes equal to 1.

If the sum is within the predetermined range, it can be determined that the colors being used in the input image are close to the representative colors. Therefore, there is no problem in performing the color limiting process for the colors being used the image. On the other hand, if the sum is outside the predetermined range, there is a possibility that the colors being used in the input image are far different from the representative colors. Therefore, it can be expected that if the color limiting process is performed for the colors being used in the image, some colors may be changed drastically. Accordingly, in such a case, it is determined that the color limiting process is not to be executed. Also, since the summed value may change depending on the size of the input image such as the number of pixels, the sum may be normalized and then it is determined as to whether or not the normalized sum is within the predetermined range.

Figure 5:
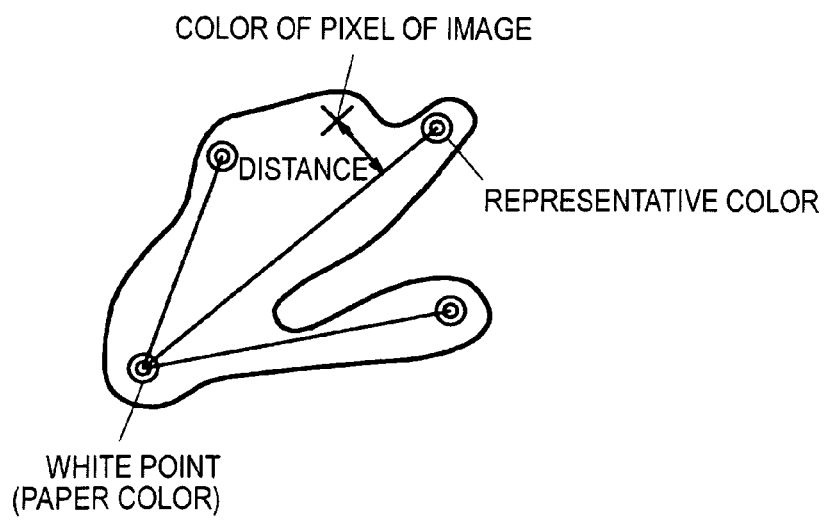
FIG. 5 is an explanatory view showing a second operation example of the determining section according to the first exemplary embodiment of the invention.

FIG. 5 is an explanatory view showing a second operation example of the determining section 2 according to the first exemplary embodiment of the invention. As another method of determining as to whether or not the color limiting process is to be performed, the following method may be performed. That is, the method calculates a sum of distances between the colors of the respective pixels of the input image and straight lines connecting a white point to the representative colors, and determines as to whether the sum is within a predetermined range. Usually, a paper color is selected as one of the representative colors and as the white point. Therefore, the white point is selected from the representative colors and the straight lines connecting the white point to other representative colors are drawn. FIG. 5 shows straight lines each connecting the white point to one representative color other than the white point. Colors on this straight line have approximately the same hue, and it can be considered that there will be no problem if colors on this straight line or their neighboring colors are converted to the representative colors. In this exemplary embodiment, the distances between the color of each pixel of the input image and the respective straight lines are calculated and the minimum distance is adopted for each pixel. In FIG. 5, the pixel color is denoted by "X" and the distance to the straight line is represented by a bidirectional arrow.

In this manner, the minimum distances obtained for the colors of the respective pixels are summed, and it is determined as to whether or not the sum is within the predetermined range. If the sum is within the predetermined range, it can be determined that even if the colors being used in the input image are converted to the representative colors, the resulting colors have approximately the same hue. Therefore, there is no problem in performing the color limiting process for the colors being used in the image. On the other hand, if the sum is outside the predetermined range, it can be considered that if the colors being used in the input image are converted to the representative colors, the resulting colors may be changed drastically in their hue levels. Therefore, in such a case, it is determined that the color limiting process is not to be executed. Also, in this case, since the summed value may change depending on the size of the input image such as the number of pixels, the sum may be normalized and then it is determined as to whether or not the normalized sum is within the predetermined range.

Figure 6:
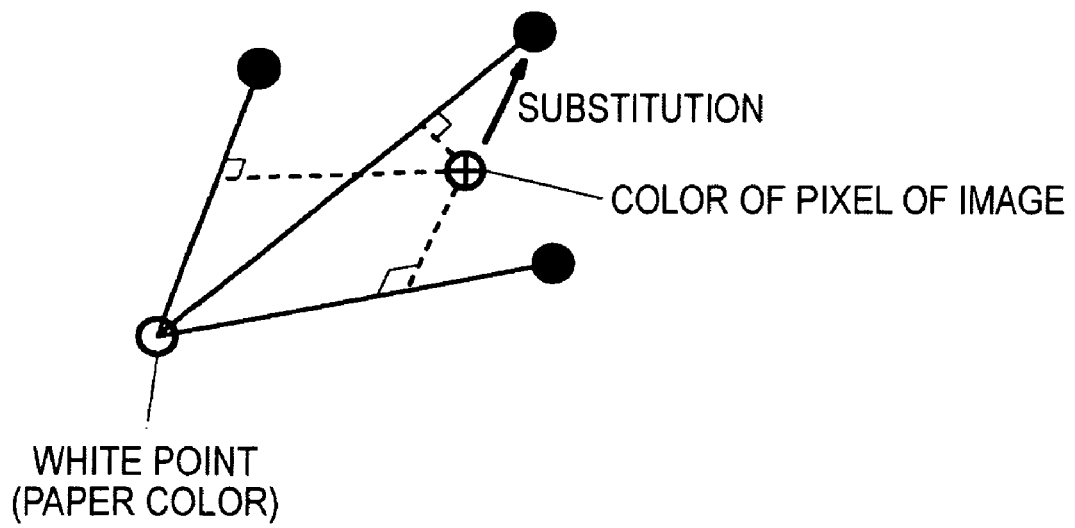
FIG. 6 is an explanatory view showing an example of color conversion, performed by a color conversion section, into representative colors.

When the determining section 2 determines that the color limiting process is to be executed, the color conversion section 3 converts the colors of the pixels of the input image to the representative colors extracted by the analysis section 1. For example, the color of the pixel may be converted to the representative color having the minimum distance from the colors of the pixel to be converted among the representative colors. Alternatively, a method as described below may be used. FIG. 6 is an explanatory view showing an example of the color conversion into the representative colors by the color conversion section 3. In FIG. 6, as described above in connection with the second operation example of the determining section 2, straight lines each connecting a white point to one representative color other than the white point are drawn. Then, a straight line that is at the minimum distance from the color of the pixel to be converted (denoted by a crossed-out circle in the drawing) is determined, and the color of the pixel color to be converted is converted to the representative color constructing the determined straight line. It is to be noted that by using the above methods in combination, if the distance to the white point (sheet color) is the shortest, the color of the pixel may be converted to the white point, and otherwise, a straight line at the minimum distance may be determined and the color of the pixel may be converted to the representative color constructing the determined straight line. Moreover, other methods may be used in converting to the representative color. By such color conversion into the representative colors, the color limiting process is performed. As a result, the input image is converted to an image in which the number of colors being used is limited to the number of representative colors.

If the determining section 2 determines that the color limiting process is not to be executed, it is concerned that the color limiting process may convert the input image to an image having greatly different colors. Therefore, the color conversion section 3 does not perform the color conversion into the representative colors. Alternatively, the image obtained by converting the original colors to the representative colors may not be output or may not be processed in the post-processing (in this example, the compression section 4).

Figure 7:
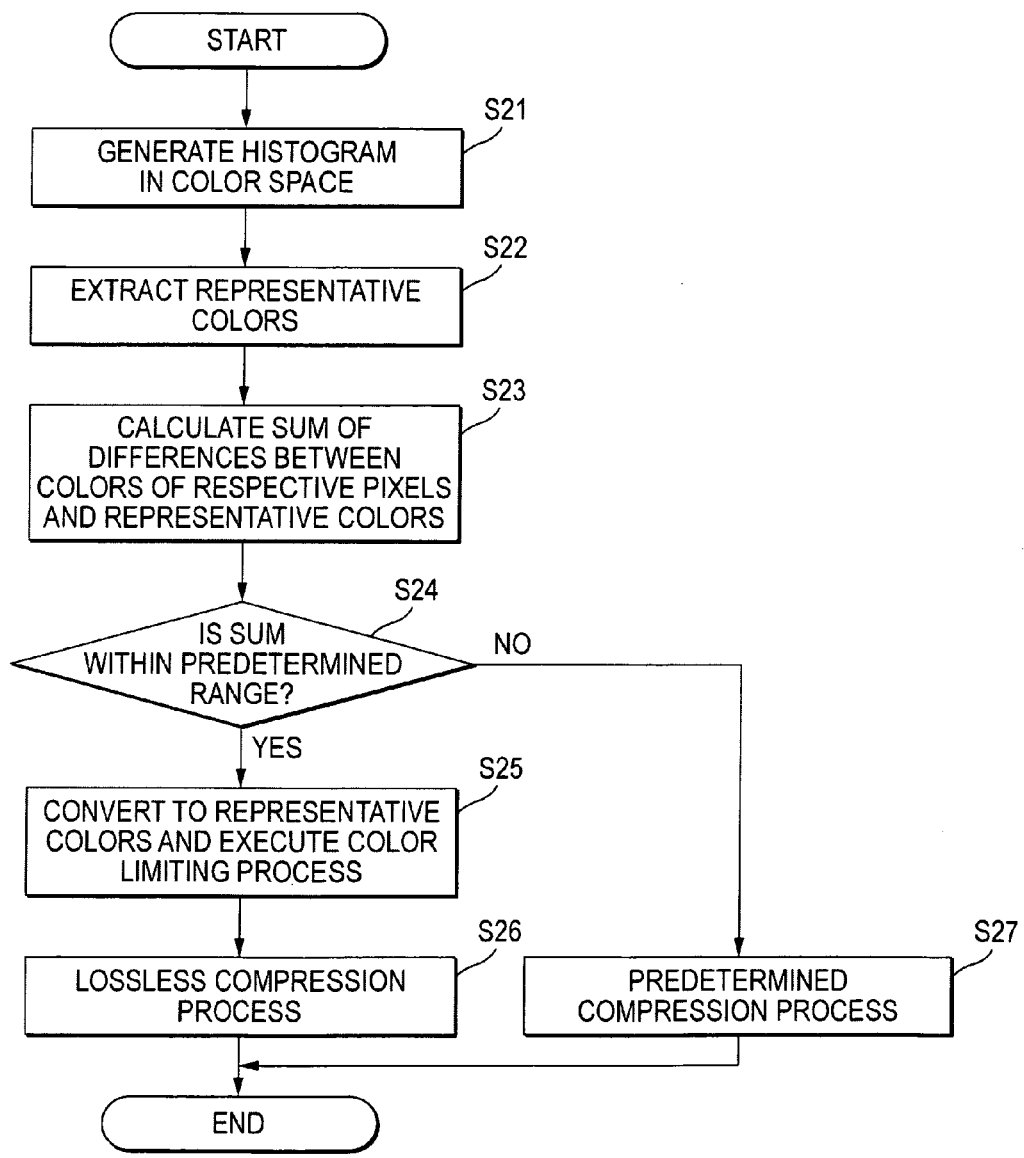
FIG. 7 is a flow chart showing the first operation example according to the first exemplary embodiment of the invention.

Hereinafter, an outline of the operation in the first exemplary embodiment of the invention will be described. FIG. 7 is a flow chart showing the first operation example according to the first exemplary embodiment of the invention. In this flow chart, it is assumed that the determining section 2 operates in accordance with the first operation example. In step S21, the histogram generating section 11 of the analysis section 1 generates a three-dimensional histogram in a color space, based on an input image. In step S22, the peak-color extracting section 12 of the analysis section 1 extracts peak colors based on the generated histogram, and the representative-color selecting section 13 selects representative colors from the peak colors.

In step S23, the determining section 2 calculates a sum of differences between the representative colors obtained by the analysis section 1 and colors of the respective pixels of the input image. In step S24, it is determined as to whether or not the calculated sum is within a predetermined range. If the sum is within the predetermined range, the color conversion section 3 performs the color limiting process of converting the color of each pixel of the input image to any one of the representative colors selected in step S22 (step S25). In this example, in step S26, the compression section 4 performs lossless compression process for the color-limited image, and outputs the compressed image.

If it is determined in step S24 that the sum is not within the predetermined range, the color conversion section 3 does not perform the color limiting process. In this example, in step S27, the computer portion 4 performs a predetermined compression process for the input image, and outputs the compressed image.

Figure 8:
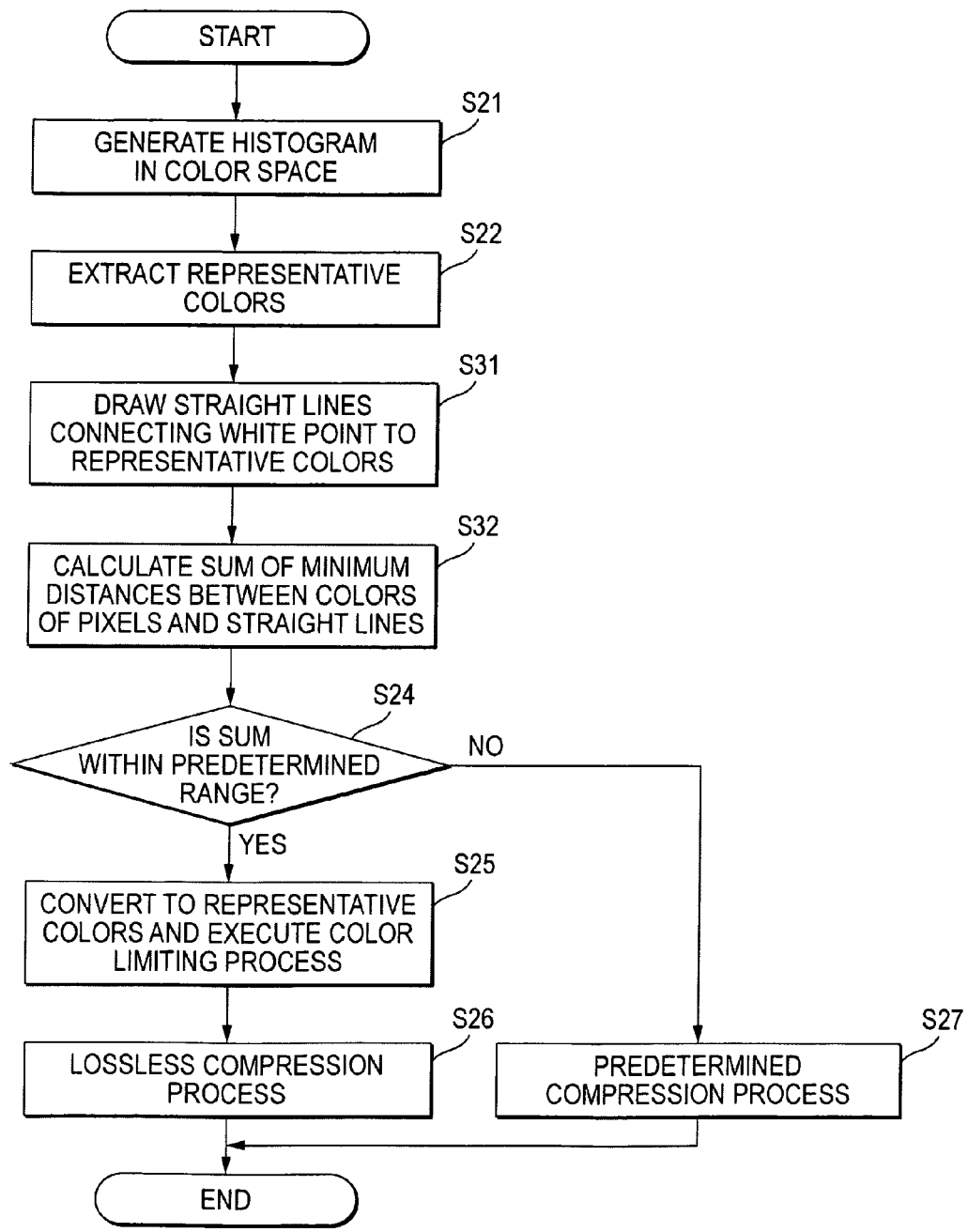
FIG. 8 is a flow chart showing the second operation example according to the first exemplary embodiment of the invention.

FIG. 8 is a flow chart showing the second operation example according to the first exemplary embodiment of the invention. In this flow chart, it is assumed that the determining section 2 operates in accordance with the second operation example. In step S21, the histogram generating section 11 of the analysis section 1 generates a three-dimensional histogram in a color space based on an input image. In step S22, the peak-color extracting section 12 of the analysis section 1 extracts peak colors based on the generated histogram, and the representative-color selecting section 13 selects representative colors from the peak colors.

In step S31, the determining section 2 draws straight lines each connecting a white point to a representative color other than the white point among the representative colors obtained by the analysis section 1. Then, in step S32, a sum of minimum distances between the pixel colors of the input image and the straight lines drawn in step S31 is calculated. In step S24, it is determined as to whether or not the calculated sum is within a predetermined range. If the sum is within the predetermined range, the color conversion section 3 performs the color limiting process of converting the color of each pixel of the input image to any one of the representative colors selected in step S22 (step S25) In this example, in step S26, the compression section 4 performs a lossless compression process for the color-limited image, and outputs the compressed image. On the other hand, if it is determined in step S24 that the sum is not within the predetermined range, the color conversion section 3 does not perform the color limiting process. In this example, in step S27, the computer portion 4 performs a predetermined compression process for the input image, and outputs the compressed image.

Figure 9:
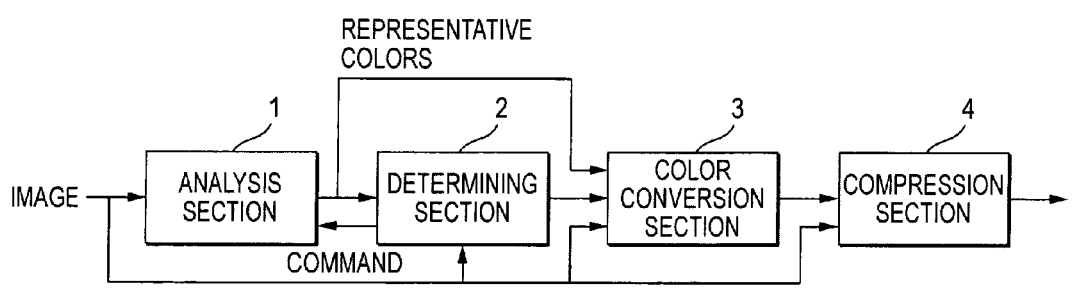
FIG. 9 is a block diagram showing a second exemplary embodiment of the invention.

FIG. 9 is a block diagram showing a second exemplary embodiment of the invention. This exemplary embodiment is different from the first exemplary embodiment shown in FIG. 1, in that the number of representative colors extracted by the analysis section 1 is increased in accordance with the determination results by the determining section 2 in the second exemplary embodiment.

The determining section 2 of the second exemplary embodiment determines as to whether or not the color limiting process is to be executed, based on, for example, the sum of differences between the colors of the respective pixels of the input image and the representative colors or the sum of distances between the colors of the respective pixels of the input image and the straight lines connecting the white point to the representative colors other than the white colors, as described in the first exemplary embodiment. In this exemplary embodiment, predetermined criteria A and B (A<B) are provided: a range within the criterion A is used as a first range and a range between the criterion A (excluding A) and the criterion B is used as a second range. If the sum is within the first range, it is determined that the color limiting process is to be executed. If the sum does not belong to any of the first and second ranges, it is determined that the color limiting process is not to be executed. If the sum is within the second range, a command is sent to the analysis section 1 to increase the number of representative colors selected.

In the analysis section 1, as described in the first exemplary embodiment, the histogram generating section 11 creates a three-dimensional histogram in a color space, and the representative-color selecting section 13 selects several representative colors from the peak colors extracted by the peak-color extracting section 12. If the analysis section 1 is requested by the determining section 2 to increase the number of representative colors, an increased number of representative colors are selected from the peak colors and are sent to the determining section 2.

When the number of representative colors selected by the analysis section 1 is increased, the determining section 2 determines as to which range the sum belongs to. When the number of representative colors is increased, the colors near the newly added representative colors or the colors having a short distance to the line segment connecting the newly added representative colors to the white point may act to decrease the summed value. Therefore, it is likely that the sum belongs to the first range. If the sum, which is obtained based on the newly added representative colors, is within the first range, it is determined that the color limiting process is to be executed using the newly added representative colors. If the sum, which is obtained based on the newly add representative colors, is within the second range, the number of representative colors selected by the analysis section 1 is further increased. If the sum, which is obtained based on the newly added representative colors, does not belong to any of the first and second ranges, it is determined that the color limiting process is not to be executed. In this case, since the color limiting process is not executed, the representative colors are not used.

The method of increasing the number of representative colors depends on the method of selecting the representative colors. For example, if the peak colors are selected as the representative colors in the descending order of their counting values, peak colors having the greater counting values than the peak colors which were not selected in the previous step are added to the representative colors. If similar peak colors are grouped and selected as the representative colors, a parameter for grouping the similar peak colors may be changed in such a way that the peak colors are not grouped. In the case of using this method, the procedures of grouping the peak colors are memorized, and when the determining section 2 has issued a command for increasing the number of representative colors, the representative colors are selected from the peak colors as they were in the previous step of the grouping procedures.

If the number of representative colors, which are selected by the analysis section 1 in accordance with the command from the determining section 2, becomes large, the color limiting process may become less significant. For example, when performing a compression process as shown in FIGS. 1 and 7, if the number of representative colors is large and does not decrease, the compression ratio would not be improved. Therefore, the color limiting process may become less significant. For this reason, if the number of representative colors is larger than a predetermined number, the determining section 2 does not request the analysis section 1 to increase the number of representative colors and determines that the color limiting process is not to be executed. Alternatively, if the number of representative colors, which are selected by the analysis section 1 in accordance with the command from the determining section 2, is larger than a predetermined number, it is reported to the determining section 2 that the number of representative colors selected is larger than the predetermined number, so that it is determined that the color limiting process is not to be executed. Also, when the analysis section 1 has to select the representative colors by the number, which is larger than the number of the peak colors, in accordance with the command from the determining section 2, it is reported to the determining section 2 that it is impossible to select a further representative color, so that it is determined that the color limiting process is not to be executed.

In the second exemplary embodiment, the analysis section 1 selects the representative colors while the determining section 2 is making determination. Therefore, as compared with the first exemplary embodiment in which the representative colors are selected in a single step, the representative colors are selected more optimally, and the color limiting process is performed.

Figure 10:
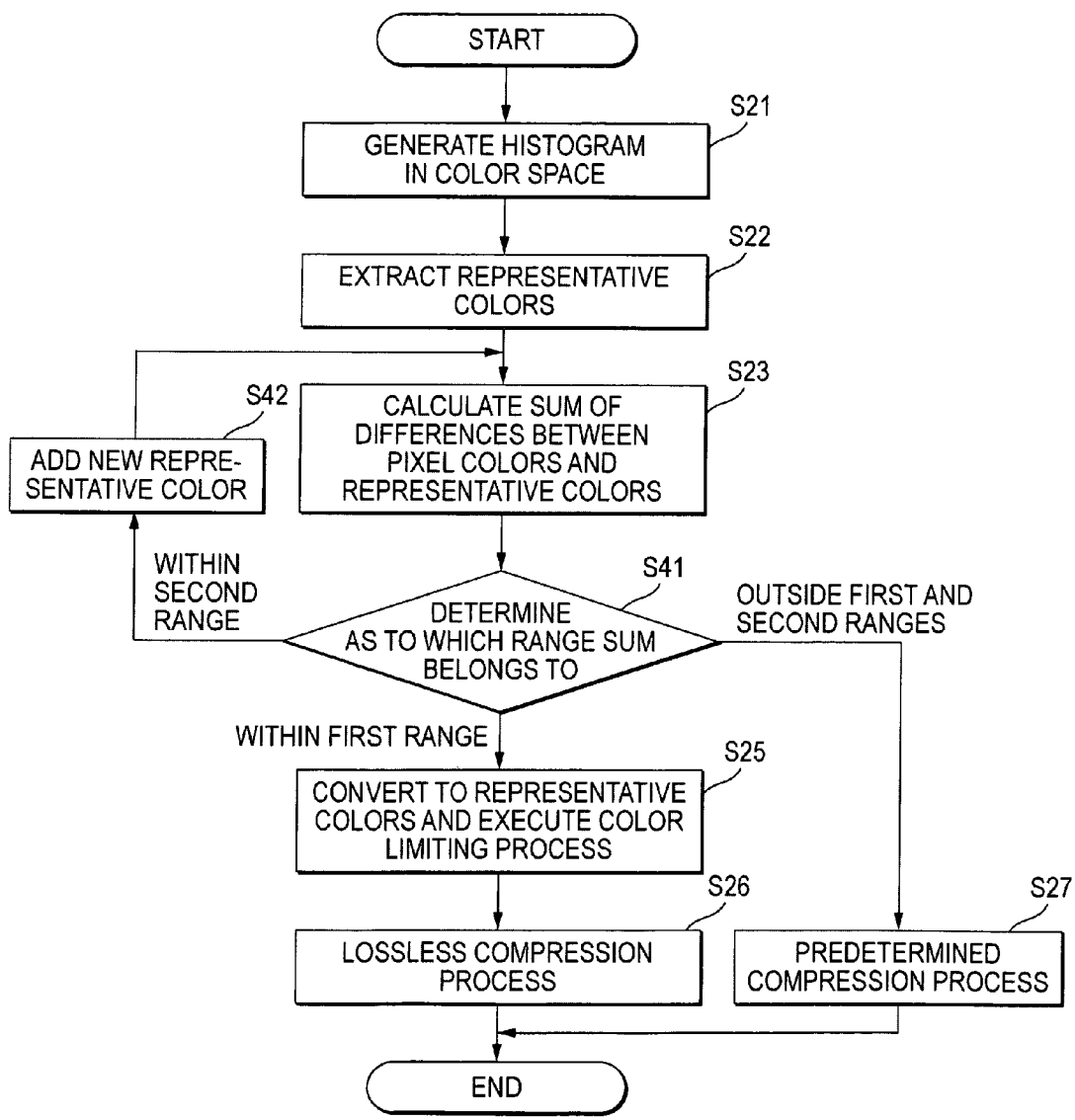
FIG. 10 is a flow chart showing an outline of an operation example according to the second exemplary embodiment of the invention.

FIG. 10 is a flow chart showing an outline of an operation example according to the second exemplary embodiment of the invention. In step S21, the analysis section 1 generates a three-dimensional histogram in a color space based on an input image. In step S22, the representative colors are selected from peak colors based on the generated histogram.

In step S23, the determining section 2 calculates a sum of differences between the representative colors obtained by the analysis section 1 and colors of the respective pixels of the input image. Also, instead of performing the process of step S23, in steps S31 and S32 of FIG. 8, straight lines connecting the white point to representative colors other than the white point may be drawn and the sum of minimum distances between the colors of the respective pixels of the input image and the straight lines may be calculated.

In step S41, it is determined as to whether the calculated sum belongs to the first range or the second range, or is outside the first and second ranges. In this case, the first and second ranges are provided so that predetermined criteria A and B (A<B) are first provided and a range within the criterion A is used as the first range and a range between the criterion A (excluding A) and the criterion B is used as the second range. If the sum belong to the second range between the criterion A (excluding A) and the criterion B, the determining section 2 requests the analysis section 1 to increase the number of representative colors. Then, in step S42, the analysis section 1 selects one or plural new representative colors from the colors that have not been selected as the representative colors, in accordance with the command from the determining section 2. Then, the analysis section 1 sends the newly selected representative colors to the determining section 2. Then, the calculation of the summed value in step S23 and the determination regarding the summed value in step S41 are repeated. By increasing the number of representative colors, the sum would belong to the first range in the determination of step S41. However, as described above, if the sum after the repeated process does not belong to the first range and the number of representative colors is larger than a predetermined number or if there remains no color to be selected as the representative color, it is determined that the sum is outside the first and second ranges.

If it is determined in step S41 that the sum belongs to the first range, the color conversion section 3 performs the color limiting process of converting the color of each pixel of the input image to any one of the representative colors selected in step S22 (step S25). In this example, in step S26, the compression section 4 performs a lossless compression process for the color-limited image, and outputs the compressed image. On the other hand, if it is determined in step S41 that the sum is outside the first and second ranges, the color conversion section 3 does not perform the color limiting process. In this example, in step S27, the computer portion 4 performs a predetermined compression process for the input image, and outputs the compressed image.

Figure 11:
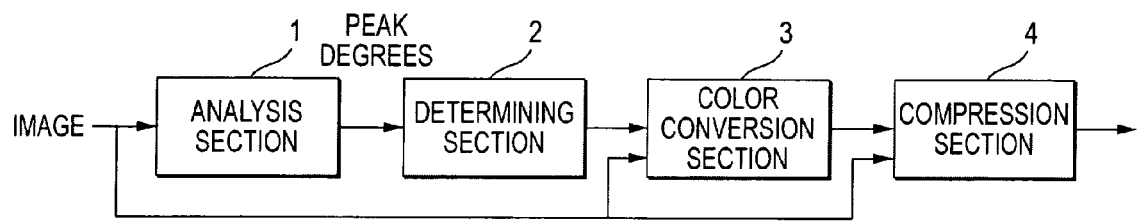
FIG. 11 is a block diagram showing a third exemplary embodiment of the invention.

FIG. 11 is a block diagram showing a third exemplary embodiment of the invention. The third exemplary embodiment is different from the first exemplary embodiment shown in FIG. 1, in that the analysis section 1, the determining section 2, and the color conversion section 3 are operated in a different way in the third exemplary embodiment.

In the third exemplary embodiment, the analysis section 1 counts color values of respective pixels of the input image, generates a three-dimensional histogram in a color space, and calculates peak degrees such as derivative values or gradients at the respective peaks in the histogram. The peak degrees represent extent to which colors adjacent to the peak color are used. The greater peak degree represents that the peak color is more frequently used in the input image and that the number of colors similar to the peak color is small. Also, in areas having strong edges such as characters, there is no problem in executing the color limiting process. Therefore, the histogram is generated while excluding such areas having strong edges, and the peak degree is calculated based on the thus-generated histogram. Thereby, the determining section 2 makes determination based on the thus-calculated peak degrees.

The determining section 2 extracts peaks having the peak degrees being equal to or larger than a predetermined threshold value, from the respective peaks in the histogram. If the number of extracted peaks is within a predetermined range, the determining section determines that the color limiting process is to be executed. When the number of colors mainly used in the image is within a predetermined range, it is determined that there is no problem in executing the color limiting process for the colors of the pixels of the image. When many colors are used in an image and the many colors are converted to a small number of colors, there is a problem that the original colors of the image are not properly reproduced. Moreover, when the color limiting process is performed using the many colors as the representative colors, it may be difficult to achieve the advantage of the color limiting process. Therefore, when the number of peaks having the peak degrees being equal to or larger than the predetermined threshold value is larger than a predetermined number, it is determined that the color limiting process is not to be executed.

Since in the third exemplary embodiment, the representative colors are not extracted by the analysis section 1 or the determining section 2, the color conversion section 3 selects the representative colors and performs the color conversion into the representative colors. That is, the color conversion section 3 performs the processes of the respective sections of FIG. 2, which are shown as the configuration of the analysis section 1 of the first exemplary embodiment and the processes of the color conversion section 3 of the first exemplary embodiment. Although the histogram is generated by the analysis section 1, when the analysis section 1 has generated the histogram while excluding areas having strong edges, the thus-generated histogram cannot be used, per se, in selection of the representative colors. Therefore, it is necessary to regenerate a new histogram, or to count the color values of the respective colors in the areas having the strong edges and generate the histogram. The process of extracting peak colors from the histogram, selecting representative colors from the extracted peak colors, and converting the color of each pixel of the input image to any one of the representative colors are described above. Thus, the duplicate description thereon will be omitted here. When the determining section 2 determines that the color limiting process is to be executed, the color conversion section 3 performs the color conversion into the representative colors.

The analysis section 1 and the determining section 2 has excluded an image in which many colors are used, from the subject of the color limiting process by the color conversion section 3. Therefore, when the color conversion section 3 extracts representative colors from the input image and performs the color conversion into the representative colors, there is no problem of causing poor color reproduction. Also, when the compression section 4 compresses the image, it is possible to obtain a high compression ratio.

Figure 12:
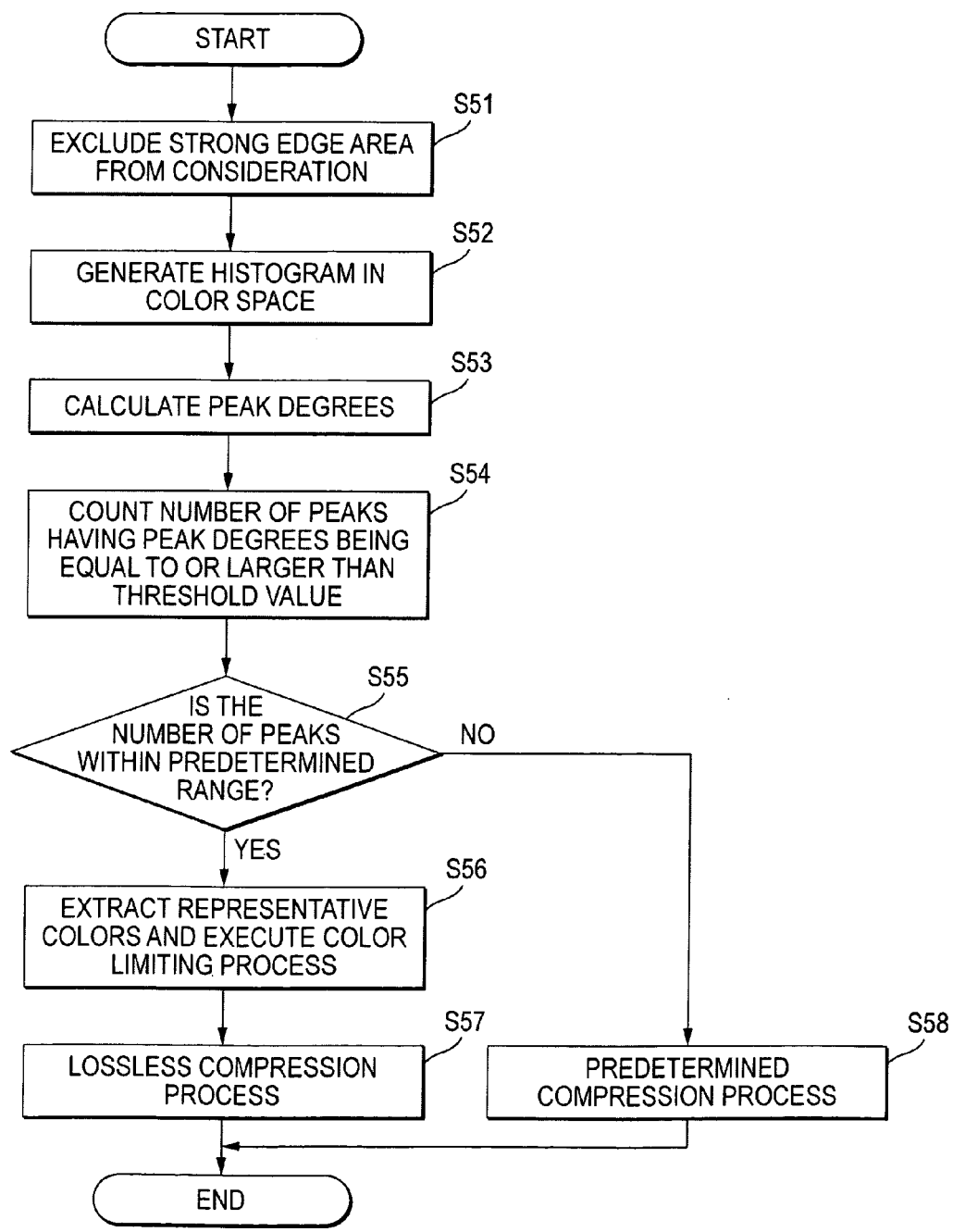
FIG. 12 is a flow chart showing an outline of an operation example according to the third exemplary embodiment of the invention.

FIG. 12 is a flow chart showing an outline of an operation example according to the third exemplary embodiment of the invention. The analysis section 1 excludes areas having strong edges in an input image from consideration in step S51 and generates a three-dimensional histogram in a color space in step S52. In step S53, the analysis section 1 calculates peak degrees such as derivative values or gradients from the respective peaks, based on the generated histogram.

Upon receipt of the peak degrees at the respective peaks in the histogram from the analysis section 1, the determining section 2 counts in step S54 the number of peaks having peak degrees being equal to or larger than the predetermined threshold value and determines in step S55 as to whether or not the number of peaks is within the predetermined range. If the number of peaks is within the predetermined range, the color conversion section 3 extracts representative colors from the input image and performs the color limiting process of converting the color of each pixel of the input image to any one of the representative colors (step S56). In this example, in step S57, the compression section 4 performs a lossless compression process for the color-limited image, and outputs the compressed image.

On the other hand, if it is determined in step S55 that the number of peaks is not within the predetermined range, the color conversion section 3 does not perform the color limiting process. In this example, in step S58, the computer portion 4 performs a predetermined compression process for the input image, and outputs the compressed image.

Figure 13:
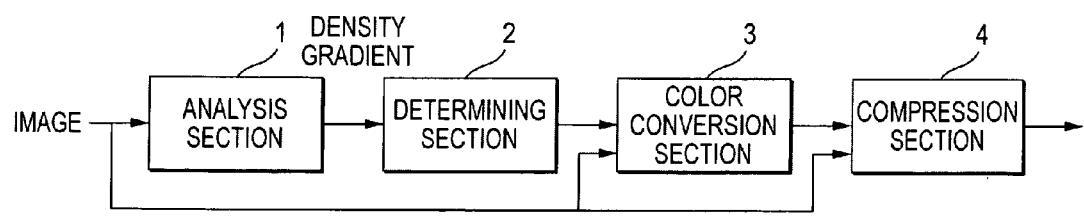
FIG. 13 is a block diagram showing a fourth exemplary embodiment of the invention.

FIG. 13 is a block diagram showing a fourth exemplary embodiment of the invention. This exemplary embodiment is different from the third exemplary embodiment, in that in the analysis section 1 and the determining section 2 operate in a different way in the fourth exemplary embodiment. In the fourth exemplary embodiment, the analysis section 1 detects a density gradient in an input image. If the density gradient detected by the analysis section 1 is equal to or smaller than a predetermined threshold value, the determining section 2 determines that the color limiting process is to be executed.

For example, in an area painted with a certain color, there is no problem if the color is converted to the same color. On the other hand, in a gradation area where a color gradually changes, if the colors are converted by the color limiting process to one or several colors, the gradation may disappear. Therefore, it may be better not to perform the color limiting process if a density gradient such as gradation is present. In the fourth exemplary embodiment, if the density gradient is larger than a predetermined threshold value, it is determined that gradation or the like is present and thus the color limiting process is not to be executed.

Moreover, an edge portion has a large density gradient. Therefore, in order not to detect such edges as being gradation, when the analysis section 1 detects the density gradient, areas such as characters having strong edges are excluded from consideration.

Figure 14:
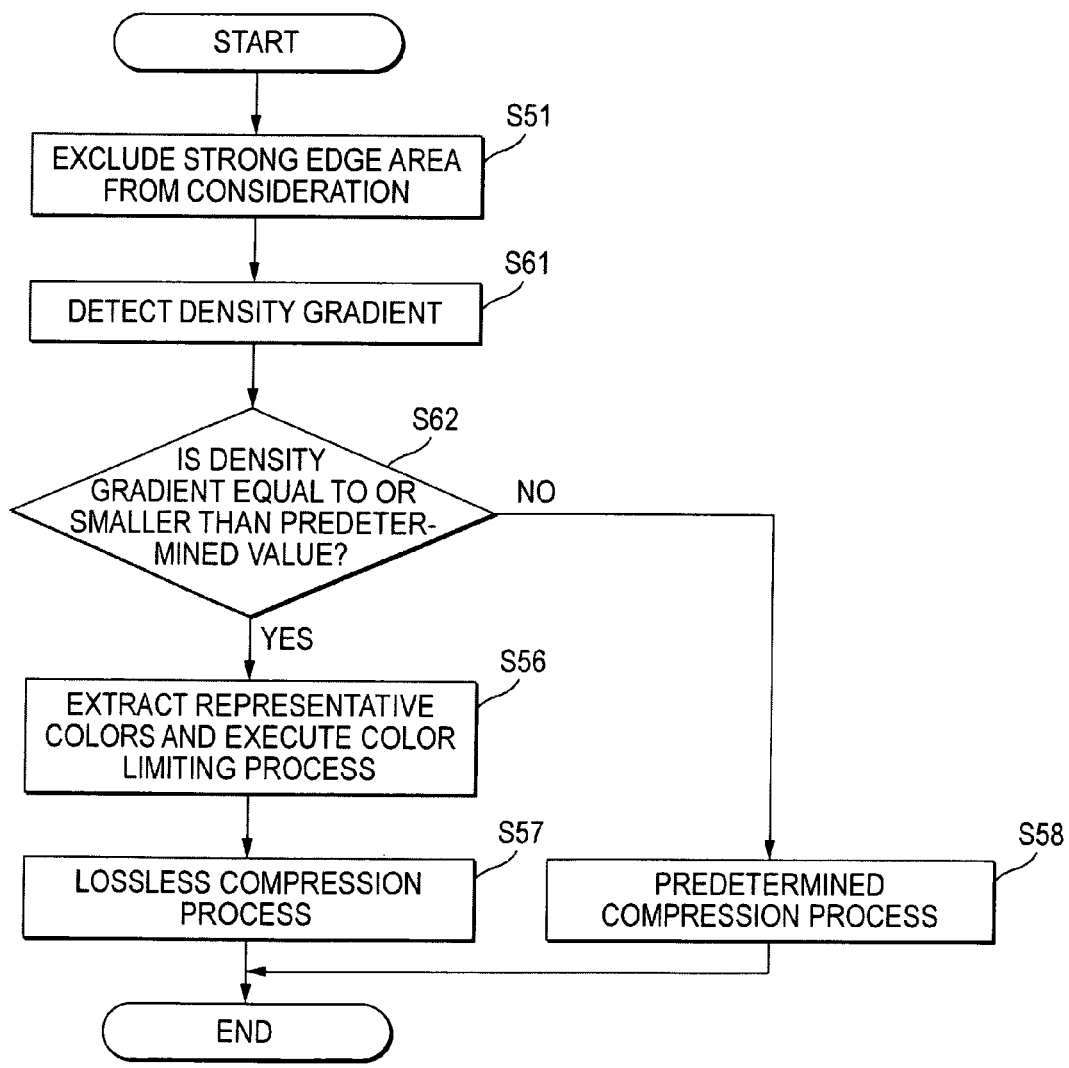
FIG. 14 is a flow chart showing an outline of an operation example according to the fourth exemplary embodiment of the invention.

FIG. 14 is a flow chart showing an outline of an operation example according to the fourth exemplary embodiment of the invention. The analysis section 1 excludes areas having strong edges in an input image from consideration in step S51 and detects a density gradient in the input image in step S61.

In step S62, the determining section 2 determines as to whether or not the density gradient received from the analysis section 1 is equal to or smaller than a predetermined threshold value. If the density gradient is equal to or smaller than the predetermined threshold value, the color conversion section 3 extracts representative colors from the input image and performs the color limiting process of converting the color of each pixel of the input image to any one of the representative colors (step S56). In this example, in step S57, the compression section 4 performs a lossless compression process for the color-limited image, and outputs the compressed image.

On the other hand, if it is determined in step S62 that the density gradient is larger than the predetermined threshold value, the color conversion section 3 does not perform the color limiting process. In this example, in step S58, the compression portion 4 performs a predetermined compression process for the input image, and outputs the compressed image.

FIG. 15 is an explanatory view of an example of a computer, computer program and a storage medium storing the computer program when functions of the exemplary embodiments of the invention are implemented in computer program. In the drawing, reference numeral 71 denotes a computer, reference numeral 72 denotes program, reference numeral 81 denotes an optomagnetic disk, reference numeral 82 denotes an optical disk, reference numeral 83 denotes a magnetic disk, reference numeral 84 denotes a memory, reference numeral 91 denotes a CPU, reference numeral 92 denotes an internal memory, reference numeral 93 denotes a reading section, reference numeral 94 denotes a hard disk, reference numeral 95 denotes an interface, and reference numeral 96 denotes a communicating section.

A part or the entire of the functions of the portions described in connection with the exemplary embodiments or the modified examples may be implemented in the program 71 that can be executed by a computer. In this case, the program 71 and data or the like used by the program may be stored in a storage medium that can be read by a computer. Here, the storage medium refers to a medium that causes magnetic, optical, or electrical changes in the energy state in accordance with the descriptive contents of program to occur on the reading section 93 equipped in the hardware resources of a computer and transmits the descriptive contents of the program in the form of corresponding signals to the reading section 93. Examples of such a storage medium include the optomagnetic disk 81, the optical disk 82 (including CDs and DVDs), the magnetic disk 83, and the memory 84 (including IC cards and memory cards). Needless to say, these storage media are not restricted to portable ones.

When the program 71 is stored in the storage medium and the storage medium is mounted on the reading section 93 of the computer 72 or the interface 95, for example, the program 71 is read out from the computer and stored in the internal memory 92 or the hard disk 94 to allow the CPU 91 to execute the program 71, whereby a part or the entire of the functions described in connection with the exemplary embodiments of the invention or the modified examples is realized. Alternatively, the program 71 is transmitted to the computer 72 via a network or the like and then in the computer 72, the program 71 is received by the communicating section 96 and is stored in the internal memory 92 or the hard disk 94 to allow the CPU 91 to execute the program 71, whereby a part or the entire of the functions described in connection with the exemplary embodiments of the invention or the modified examples is realized. In addition, the computer 72 may be connected to other devices via the interface 95; for example, a display device for displaying information, an input device for allowing users to input information, and the like may be connected to the computer 72. Additionally or alternatively, image forming means for forming the color-limited image may be connected to the computer. In addition, for example, when the compression process as described in the exemplary embodiments is to be performed, the compressed image may be stored in the hard disk 94 or may be transmitted from the communicating section 96 to other devices.

Needless to say, some of the functions may be implemented in hardware, and alternatively, the entire of the functions may be implemented in hardware. Alternatively, the invention may be implemented in program together with other constructions. For example, an apparatus having an image reading device may be implemented in single program together with control program thereof, and the program may automatically determine as to whether or not the color limiting process is to be executed on the image read by the image reading device and execute the color limiting process on the image that the program has determined that the color limiting process is to be executed thereon. Needless to say, when the invention is applied to other purposes, the program of the invention may be integrated with another program for that purpose.

What is claimed is:

1. An image processing apparatus comprising:
   an analyzing unit that analyzes colors being used in an image;

a determining unit that determines, based on an analysis result provided by the analyzing unit, as to whether or not the colors being used in the image are to be converted into one or more limited colors; and a color conversion unit, wherein when the determining unit determines that the colors being used in the image are to be converted into the one or more limited colors, the color conversion unit converts the colors being used in the image into the one or more limited colors, wherein the analyzing unit extracts one or more representative colors of the colors being used in the image, the determining unit determines as to whether or not the colors being used in the image are to be converted into the one or more limited colors with the extracted one or more representative colors being used as the one or more limited colors, the color conversion unit converts the color being used in the image into the one or more representative colors, the determining unit calculates a sum of differences between the colors of respective pixels of the image and the one or more representative colors into which the colors are to be converted, and if the sum is within a predetermined range, the determining unit determines that the colors of the corresponding pixels of the image are to be converted to the one or more representative colors.

2. The image processing apparatus according to claim 1, wherein the determining unit calculates a sum of differences between the colors of respective pixels of the image and the one or more representative colors into which the colors are to be converted, if the sum is within a first range, the determining unit determines that the colors of the corresponding pixels of the image are to be converted into the one or more representative colors, if the sum is outside the first range and within a second range, the determining unit requests the analyzing unit to extract a new representative color, and upon receipt of the request of the new representative color from the determining unit, the analyzing unit newly extracts a color of the image that has not been extracted, as the new representative color and the determining unit makes the determination based on the one or more representative colors and the new representative color.

3. The image processing apparatus according to claim 1, wherein the analyzing unit at least extracts (i) a white point or a paper color point and (ii) other colors as the representative colors, the determining unit sets, in a color space, straight lines connecting the white point or the paper color point to the representative colors other than the white point or the paper color point, the determining unit calculates a sum of minimum distances between the straight lines and the colors of the respective pixels in the image, and if the sum is within a predetermined range, the determining unit determines that the colors being used in the image are to be converted into the corresponding representative colors.

4. The image processing apparatus according to claim 1, wherein the analyzing unit generates a histogram in a color space based on the colors being used in the image and calculates peak degrees at respective peaks in the histogram, and if the number of peaks, in the histogram, that have peak degrees being equal to or larger than a predetermined threshold value is within a predetermined range, the determining unit determines that the colors being used in the image are to be converted into the one or more limited colors.

5. The image processing apparatus according to claim 4, wherein the analyzing unit generates the histogram except for an area of the image in which an edge intensity is equal to or larger than a predetermined value.

6. The image processing apparatus according to claim 1, wherein the analyzing unit detects a density gradient in an area of the image, excluding an area of the image in which an edge intensity is equal to or larger than a predetermined value, and if the density gradient in the area of the image is equal to or smaller than a predetermined threshold value, the determining unit determines that the colors being used in the image are to be converted into the one or more limited colors.

7. A computer implemented image processing method for converting the colors of pixels in an image, the method comprising the computer implemented steps of:

analyzing colors being used in an image;

determining, based on the analysis result, as to whether or not the colors being used in the image are to be converted into one or more limited colors; and when it is determined that the colors being used in the image are to be converted into the one or more limited colors, converting the colors being used in the image into the one or more limited colors, wherein the analyzing comprises extracting one or more representative colors of the colors being used in the image, the determining determines as to whether or not the colors being used in the image are to be converted into the one or more limited colors with the extracted one or more representative colors being used as the one or more limited colors, the converting converts the color being used in the image into the one or more representative colors, the determining comprises calculating a sum of differences between the colors of respective pixels of the image and the one or more representative colors into which the colors are to be converted, and if the sum is within a predetermined range, it is determined that the colors of the corresponding pixels of the image are to be converted to the one or more representative colors.

8. The image processing method according to claim 7, wherein the determining comprises calculating a sum of differences between the colors of respective pixels of the image and the one or more representative colors into which the colors are to be converted, if the sum is within a first range, it is determined that the colors of the corresponding pixels of the image are to be converted into the one or more representative colors, if the sum is outside the first range and within a second range, a new representative color is extracted, and the determining is performed based on the one or more representative colors and the new representative color.

9. The image processing method according to claim 7, wherein the analyzing at least extracts (i) a white point or a paper color point and (ii) other colors as the representative colors, the determining comprises setting, in a color space, straight lines connecting the white point or the paper color point to the representative colors other than the white point or the paper color point, calculating a sum of minimum distances between the straight lines and the colors of the respective pixels in the image, and if the sum is within a predetermined range, determining that the colors being used in the image are to be converted into the corresponding representative colors.

10. The image processing method according to claim 7, wherein the analyzing comprises generating a histogram in a color space based on the colors being used in the image, and calculating peak degrees at respective peaks in the histogram, and if the number of peaks, in the histogram, that have peak degrees being equal to or larger than a predetermined threshold value is within a predetermined range, it is determined that the colors being used in the image are to be converted into the one or more limited colors.

11. The image processing method according to claim 10, wherein the analyzing generates the histogram except for an area of the image in which an edge intensity is equal to or larger than a predetermined value.

12. The image processing method according to claim 7, wherein the analyzing comprises detecting a density gradient in an area of the image, excluding an area of the image in which an edge intensity is equal to or larger than a predetermined value, and if the density gradient in the area of the image is equal to or smaller than a predetermined threshold value, it is determined that the colors being used in the image are to be converted into to the one or more limited colors.

13. A non-transitory computer-readable medium storing a program that causes a computer to execute image processing, the image processing comprising:

analyzing colors being used in an image;

determining, based on the analysis result, as to whether or not the colors being used in the image are to be converted into one or more limited colors; and when it is determined that the colors being used in the image are to be converted into the one or more limited colors, converting the colors being used in the image into the one or more limited colors, wherein the analyzing comprises extracting one or more representative colors of the colors being used in the image, the determining determines as to whether or not the colors being used in the image are to be converted into the one or more limited colors with the extracted one or more representative colors being used as the one or more limited colors, the converting converts the color being used in the image into the one or more representative colors, the determining comprises calculating a sum of differences between the colors of respective pixels of the image and the one or more representative colors into which the colors are to be converted, and if the sum is within a predetermined range, it is determined that the colors of the corresponding pixels of the image are to be converted to the one or more representative colors.

14. The non-transitory computer-readable medium according to claim 13, wherein the analyzing comprises generating a histogram in a color space based on the colors being used in the image, and calculating peak degrees at respective peaks in the histogram, and if the number of peaks, in the histogram, that have peak degrees being equal to or larger than a predetermined threshold value is within a predetermined range, it is determined that the colors being used in the image are to be converted into the one or more limited colors.

* * * * *